United States Patent [19]

Krupke

[11] 4,053,851
[45] Oct. 11, 1977

[54] NEAR 16 MICRON $CO_2$ LASER SYSTEM

[75] Inventor: William F. Krupke, Pleasanton, Calif.

[73] Assignee: The United States of America as represented by the United States Energy Research and Development Administration, Washington, D.C.

[21] Appl. No.: 594,821

[22] Filed: July 10, 1975

[51] Int. Cl.² .............................................. H01S 3/22
[52] U.S. Cl. .............................................. 331/94.5 G
[58] Field of Search ........................ 331/94.5; 330/4.3

[56] References Cited
PUBLICATIONS

Day et al., Proceedings of the IEEE, Nov. 1969, pp. 2060–2061. TK5700 I6.

Hartmann et al., Canadian J. of Physics, vol. 44, 1966, pp. 1609–1612, Section c 1.
CHEO, in *Lasers*, vol. 3, Marcel Dekkar, Inc. (N.Y.) 1971, pp. 109, 125–135, TK7872.L3.L35.

Primary Examiner—William L. Sikes
Attorney, Agent, or Firm—Dean E. Carlson; Roger S. Gaither; L. E. Carnahan

[57] ABSTRACT

Method and apparatus for inducing laser action in $CO_2$ at a wavelength of 16 microns involving the transition between the $02^00$ and $01^10$ states. The population inversion between these two states is achieved by pumping to the $00^01$ level, suppressing the usual 10.6 micron transition to the $10^00$ level and encouraging the 9.6 micron transition, thereby populating the $02^00$ level, as the principal prerequisite for 16 micron laser action between the $02^00$ and $01^10$ levels.

19 Claims, 6 Drawing Figures

NEAR 16 MICRON CO₂ LASER SYSTEM

BACKGROUND OF THE INVENTION

The invention described herein was made in the course of, or under, Contract No. W-7405-ENG-48 with the U.S. Energy Research and Development Administration.

This invention relates to laser systems, and more particularly to a method and apparatus for inducing laser action in $CO_2$ at a wavelength of 16 microns.

In recent years, the kinetic and radiative properties of the $CO_2$ molecule have been exploited to produce powerful coherent radiation at wavelengths near 10.6 and 9.6 microns. This radiation arises from stimulated emission in the $00°1 \rightarrow 10°0$ and $00°1 \rightarrow 02°0$ vibrational bands or states, respectively. A large body of experimental, theoretical and analytical work on the $CO_2$ laser in its many forms has appeared in the last few years.

In general, $CO_2$ may be pumped by any means, which include conventional electric discharge pumping of $CO_2$ or $CO_2$ mixed with other gases to the $00°1$ state or energy level, as generally known in the laser art. However, the conventional electric discharge pumping mode is not expected to provide the best 16 micron radiation yields. The usual decay of the $00°1$ level proceeds via the transition to the $10°0$ level (which is the conventional 10.6 micron $CO_2$ laser radiation), rather than by way of the $02°0$ to $01^{1}0$ path, which provides the 16 micron radiation.

SUMMARY OF THE INVENTION

The present invention provides a 16 micron $CO_2$ laser by the transition between the $02°0$ and $01^{1}0$ states or energy levels, wherein the population inversion between these two states is achieved by pumping to the $00°1$ level, suppressing the usual 10.6 micron transition to the $10°0$ level and encouraging the 9.6 micron transition, thereby populating the $02°0$ level.

An essential element of this invention is a means to suppress the 10.6 micron decay by preventing gain at this wavelength. This is done by providing an absorber or other means within the optical cavity, which selectively prevent passage of the 10.6 micron radiation. The $00°1$ level is thus forced to decay largely to the $02°0$ level rather than the $10°0$ level by providing an optical cavity resonant at 9.6 microns (or by injecting 9.6μ radiation into the pumped $CO_2$ gas from an external laser source). Therefore, the mechanism for populating the $02°0$ state is provided, which is the level from which the desired 16.1 micron radiation is obtained, by decay to the $01^{1}0$ state. Laser action at this frequency is obtained by providing the usual optical cavity resonant at this frequency.

There are a variety of ways in which such a laser with different optical cavities (9.6 and 16.1 microns) can be constructed, for example, by using a rotating mirror, whose surfaces are arranged to alternately provide one cavity and then the other; or by the split beam approach for separating the 16 micron and 9.6 micron paths with mirrors at appropriate distances to simultaneously define both optical cavities.

Electric discharge pumping generally raises the populations of all levels, not just the $00°1$ level, and the enhanced populations of the lower levels deleteriously affect laser action involving these lower levels. This invention provides a better scheme for the initial pumping of the laser, and a preferred method of pumping $CO_2$ is used wherein nitrogen is excited by any suitable means and is exhausted through a nozzle forming vibrationally excited, but otherwise cool nitrogen gas, which is then mixed with $CO_2$ and selectively excites it to the vibrational $00°1$ state. The population of the lower levels does therefore not increase to the same extent as in the case of electric discharge pumping, with corresponding increase in the $02°0 - 01^{1}0$ gain coefficient.

In addition, the present invention also encompasses combining the above-referenced concepts, providing a high pressure, high energy gas dynamic 16 micron $CO_2$ laser, with the region in the gas flow wherein the $CO_2$ exists in its excited state enclosed in a 16 micron optical cavity, coupled with a low pressure 9.6/16.1 micron $CO_2$ laser for providing a source of stimulating radiation.

Therefore, it is an object of this invention to provide a 16 micron $CO_2$ laser.

A further object of the invention is to provide a method for inducing laser action in $CO_2$ at a wavelength of 16 microns involving the transition between the $02°0$ and $01^{1}0$ vibrational states.

Another object of the invention is to provide a 16 micron $CO_2$ laser system which involves pumping to the $00°1$ level without increasing the population of the lower levels, suppressing the 10.6 micron transition to the $10°0$ level, and providing 9.6 and 16 micron optical paths, thereby inducing 16 micron laser action between the $02°0$ and $01^{1}0$ levels.

Another object of the invention is to provide a 16 micron laser system wherein an excited gas, such as nitrogen, is mixed with $CO_2$ and selectively excites it to the vibrational $00°1$ state without increasing the population of the lower levels.

Another object of the invention is to provide a laser system wherein a high pressure, energy gas dynamic 16 micron $CO_2$ laser is coupled with a low pressure 9.6/16.1 micron $CO_2$ laser as a source of stimulating radiation.

Other objects of the invention will become readily apparent from the following description and accompanying drawings.

DESCRIPTION OF THE INVENTION

The present invention is directed to method and apparatus for inducing laser action in $CO_2$ at a 16 micron ($\mu$) wavelength involving the transition between the $02°0$ and $01^{1}0$ vibrational bands, states, or energy levels. The population inversion between these two states is achieved by pumping to the $00°1$ level, suppressing the 10.6 micron transition to the $10°0$ level and encouraging the 9.6 micron transition, thereby populating the $02°0$ level, as the principal prerequisite for 16 micron laser action between the $02^{\circ}0$ and $01^{1}0$ levels.

Prior to describing in detail the method and apparatus of this invention the kinetic and radiative properties of selected vibrational levels of the $CO_2$ molecule is analyzed for the purpose of developing the 16 micron $CO_2$ laser operating on R, Q, and P vibrational-rotational transitions of the $02^{\circ}0 \rightarrow 01^{1}0$ vibrational band or state.

Figure 1:
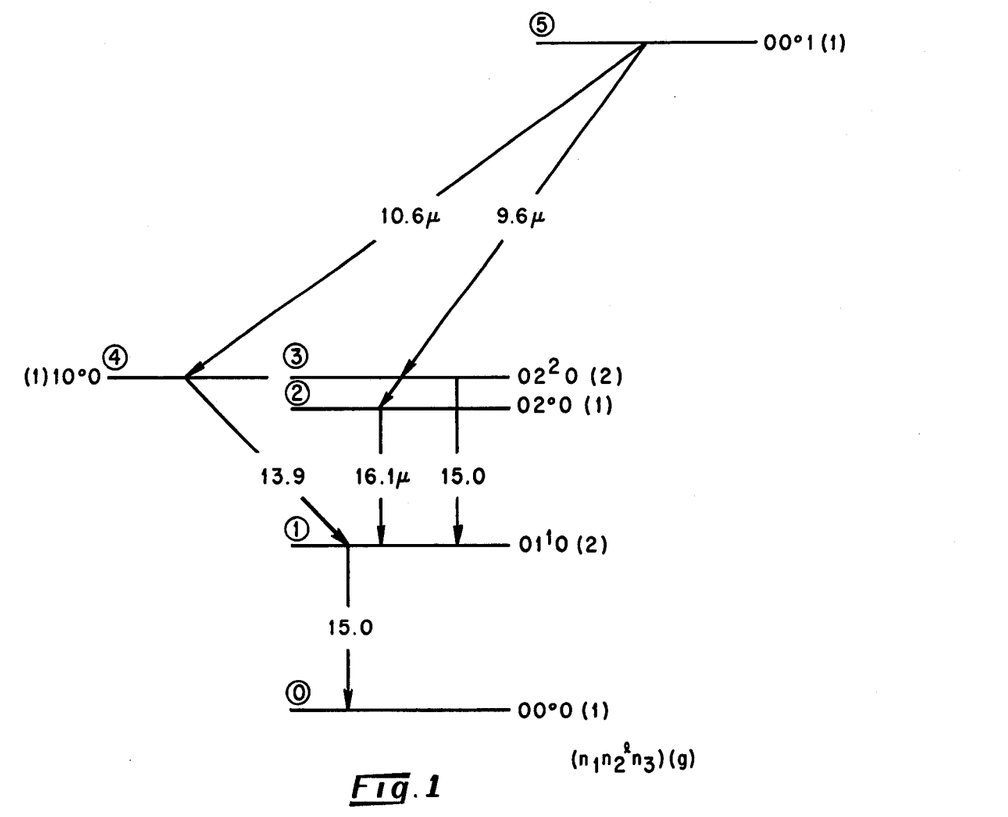
FIG. 1 illustrates the low lying vibrational levels of the $CO^2$ molecule.

FIG. 1 shows the low lying vibrational levels of the $CO_2$ molecule; each is labelled with the vibrational quantum numbers $(n_1 n_2^l n_3)$ and the vibrational degeneracy, g. To achieve a total population inversion between $02^{\circ}0$ and $01^{1}0$ levels and to provide for efficient energy extraction of 16 $\mu$ radiation, advantage will be taken of the greatly dissimilar rates for vibration-vibration (V-V), vibration-translation (V-T), and rotation-translation (R-T) energy transfer. Use will also be made of the fact that the $02^{\circ}0$ upper laser level can be rapidly and selectively pumped via stimulated emission near 9.6 microns arising from a separate population inversion established between the $00^{\circ}1$ and $02^{\circ}0$ vibrational levels.

The most important characteristic time of the 16 $\mu$ $CO_2$ laser is $Y(02^{\circ}0)$, the time required for a perturbed $02^{\circ}0$ vibrational level population density to equilibrate with the $(n,oo)$ and $(on_2^l o)$ vibrational modes of $CO_2$. This pressure-dependent time has been measured for pure $CO_2$ gas using laser saturation techniques and is expressed by $$[pY(02^{\circ}0)]^{-1} = 3 \times 10^5 (\text{torr sec})^{-1} \quad (1)$$

where p is the $CO_2$ pressure. Equilibrium is achieved by the transfer of excess energy in the $02^{\circ}0$ level to other vibrational levels through such collisional processes as $$CO_2(02^{\circ}0) + CO_2(00^{\circ}0) \rightarrow 2\, CO_2(01^{1}0) - 50.1\ cm^{-1} \quad (1a)$$

Direct conversion of excess energy in the $02^{\circ}0$ level to translational energy is much slower than the rate expressed by Eq. (1) and can be ignored here.

The time Y (rot) for a perturbed rotational level population to equilibrate with the other rotational levels of a vibrational state and with the translational degrees of freedom, is given approximately by the expression $$[PY(rot)]^{-1} = 10^7 (\text{torr-sec})^{-1} \quad (2)$$

Thus, for a $CO_2$ pressure of 1 torr, the $02^{\circ}0$ equilibration time is about 3 $\mu$sec compared to a rotational level equilibration time of about 100 nsec. In what follows, the operating pressures and stimulated emission rates will be selected such that rotational level manifolds may be considered to be always in equilibrium.

An electric dipole transition between $02^{\circ}0$ and $01^{1}0$ levels is allowed in the harmonic oscillator approximation and has a linestrength R ($02^{\circ}0$; $01^{1}0$) of $$R\ (02^{\circ}0;\ 01^{1}0) = 0.020\ (\text{Debye})^2 \quad (3)$$

This value should be recognized as being large compared to the line-strength R ($00^{\circ}1$; $02^{\circ}0$) for the conventional 9.6 $\mu$ laser transition in $CO_2$ $$R\ (00^{\circ}1;\ 02^{\circ}0) = 0.0018\ (\text{Debye})^2, \quad (4)$$

indicating the prospect for achieving high specific gain coefficients at 16 microns.

To calculate the gain coefficient $\alpha(02^{\circ}0, J'; 01^{1}0\ J)$ between the J'-th rotational level of the $02^{\circ}0$ level and the J-th rotational level of the $01^{1}0$ level, use $$\alpha(02^{\circ}0, J'; 01^{1}0, J) =$$

$$\frac{8\pi^3}{3h}\left(\frac{M}{2\pi RT}\right)^{1/2} S(J'l'; Jl)\, R\,(02^{\circ}0; 01^{1}0) \left(\frac{N^{02^{\circ}0}_{J'}}{g(02^{\circ}0)g_{J'}} - \frac{N^{01^{1}0}_{J}}{g(01^{1}0)g_J}\right)$$

for a Doppler-broadened line, where M is the molecular mass, $g(02^{\circ}0) = 1$, $g(01^{1}0) = 2$, $g_{J'} = (2J' + 1)$, $g_J = (2J + 1)$, $N_{J'}^{02^{\circ}0}$ and $N_J^{01^{1}0}$ are the number densities in the J'th rotational level of the $02^{\circ}0$ state and the J-th rotational level of the $01^{1}0$ state respectively, and S(J'l'; Jl) is the J- and l- dependent linestrength for the transition $J'l' \rightarrow Jl$. The latter quantities for R, Q, and P branches are $$S^R(J'l';\ J'-1l'+1) = (J'-l')(J'-l'+1)/4J' \quad (6)$$

$$S^Q(J'l'; J'l+1) = (J'-l')(J'+l'-1)(2J'+1)/4J'(J'+1) \quad (7)$$

$$S^P(J'l'; J'+1l'+1) = (J'+l'+2)(J'+l'+1)/4(J'+1) \quad (8)$$

which for $l' = 0 \rightarrow l' + 1 = +1$ are [i.e. $02^{\circ}0 \rightarrow 01^{1}1$]

$$S^R(J',0; J'-1,+1) = \tfrac{1}{4}(J'-1) \quad (9)$$

$$S^Q(J'0; J',+1) = \tfrac{1}{4}(2J'+1) \quad (10)$$

$$S^P(J',0; J'+1,+1) = \tfrac{1}{4}(J'+2) \quad (11)$$

Similar expressions are obtained for $$l' = 0 \rightarrow l'-1 = -1 \quad [11]$$

Figure 2:
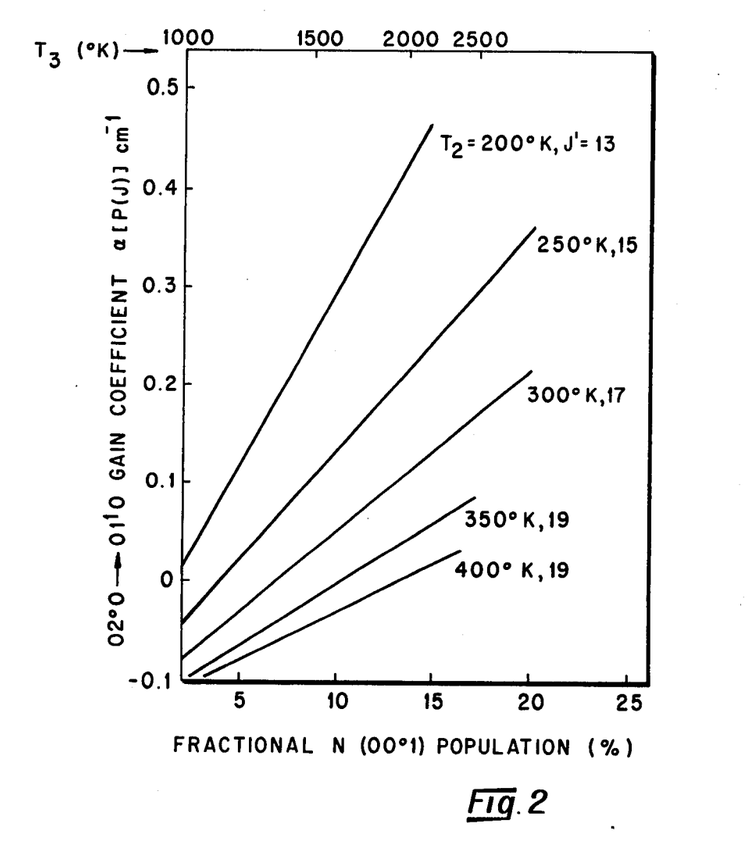
FIG. 2 graphically illustrates $02°0 \rightarrow 01^{1}0$ gain coefficients $\alpha$ [P(J)] vs. fractional N ($00°1$) population (%)

The fraction of molecules in the J'-th rotational level of a vibrational level with $N_{v'}$ molecules/cc is $$N_{J'}/N_{v'} = (2hcB_{v'}/kT)g_{J'}\ \exp\ \{-[hcB_{v'}J'(J'+1)/kT]\} \quad (12)$$

for the symmetric $CO_2$ molecule. To calculate the gain coefficient we now need to define the vibrational level population inversion density. To see how an $02^{\circ}0$–$01^{1}0$ inversion can be transiently created and to estimate a likely magnitude for it, consider a volume of $CO_2$ gas pumped by an electric discharge, as in conventional $CO_2$ lasers. The discharge will produce a population inversion between the $00^{\circ}1$ and the $10^{\circ}0$ and $02^{\circ}0$ vibrational levels. At the end of the electrical pumping pulse, the population densities $N(00^{\circ}N_3)$ can be approximated by a Boltzman distribution at temperature $T_3$, and the population densities $N(N_1 0^{\circ}0)$ and $N(0N_2^l 0)$ can be approximated by a Boltzman distribution at temperature $T_2$. We will assume, further, that the translational temperature $T_g$ and the rotational temperature $T_r$ are equal to $T_2$. At the peak of the $00^{\circ}1$–$02^{\circ}0$ population inversion density $\overline{\Delta N} = N(00^{\circ}1) - N(02^{\circ}0)$ a saturating pulse of width $Y_P$ at one or more wavelengths matching the $00^{\circ}1 \rightarrow 02^{\circ}0$ virbrational-rotational transitions is passed through the pumped volume of gas. If $Y_p$ is short compared to $Y(02^{\circ}0)$ for the operating pressure, half of the initial population inversion density will be stored in the 02°0 level. If $T_3$ was sufficiently larger than $T_2$, the new 02°0 population density $\frac{1}{2}\overline{\Delta N}$ will exceed the population density of the 01¹0 level providing transient gain near 16 $\mu$. FIG. 2 shows the small signal gain coefficient $\alpha^{P(J)}$ for P-branch transitions with highest gain as a function of temperature $T_3$ (or fractional N(00°1) population density) for a $CO_2$ pressure of one torr. Gain curves for different values of $T_2$ are shown. Note that since the upper vibrational level manifests rotational levels with even J' values only, P (and R) transitions are designated as P(J) (and R(J)) with J odd. Inspection of FIG. 2 shows that rather substantial P-branch gain coefficients are indicated for fractional N(00°1) population densities of greater than, say, 10%, particularly at lower $T_2$ temperatures. Considerably higher gain coefficients can be anticipated in the Q-branch transition(s) since the Doppler widths of many rotational transitions will over/ap. A numerical estimate for Q-branch gain can be obtained by evaluating $\alpha^{Q(J)}$ for each J value and summing over J, taking into account the differing rotational constants of upper and lower laser levels and the Doppler widths of the transitions.

From Eqs. (5), (9), and (11), we can see further that gain will exist on R(J)-branch transitions with somewhat smaller gain coefficients than the corresponding P(J) branch transitions (FIG. 2). Some of the R, Q, and P branch transitions of the 01¹0 → 02°0 band in absorption are shown in FIG. 5 of R. P. Madden, J. Chem. Phys. 35, 2083 (1961) and several measured transition energies are given in Table I.

TABLE I
MEASURED TRANSITION ENERGIES FOR SELECTED
01¹0 → 02° 0 transitions in $C^{12}O_2^{16}$

| Transition | Energy (cm$^{-1}$) |
|---|---|
| R(13) | 628.91 |
| R(11) | 627.38 |
| R(9) | 625.83 |
| Q | 618.03 |
| P(7) | 612.56 |
| P(9) | 611.00 |
| P(11) | 609.42 |
| P(13) | 607.84 |
| P(15) | 606.27 |
| P(17) | 604.70 |
| P(19) | 603.13 |
| P(21) | 601.56 |
| P(23) | 599.98 |
| P(25) | 598.40 |

It is useful to note that due to the Fermi resonance interaction, the 02°0 level is pushed energetically toward the 01¹0 level resulting in a band separation of only 618.03 cm$^{-1}$. For this reason excited state absorption from the 02°0 to 11¹0 and 03¹0 will not be a problem. If a saturating 10.6 $\mu$ transition were used to transport N(00°1) population to the 10°0 vibrational level, a population difference would be created between 10°0 and 01¹0 vibrational levels. But the energy of this band is centered at 667 cm$^{-1}$ in virtually exact resonance with strong 00°0 → 01¹0 transitions. Thus, the net gain coefficients on the 10°0 → 01¹0 band may be considerably smaller than a simple value of N(10°0) − N(01¹0) would suggest. It should be noted, that for applications to laser isotope separation which specific transitions might be needed near 16 $\mu$, some tunability can be obtained by operating at higher pressures and tuning within the pressure broadened transitions. Additional flexibility can be achieved through the use of various $CO_2$ isotopes. For example, the band center of the 02°0 → 01¹0 transition in $C^{13}O_2^{16}$ is shifted 0.70 cm$^{-1}$ to lower energy than $C^{12}O_2^{16}$, or 617.32 cm$^{-1}$. This would, for example, shift R(13) to about 628.2 cm$^{-1}$ for $C^{13}O_2^{16}$.

Figure 3:
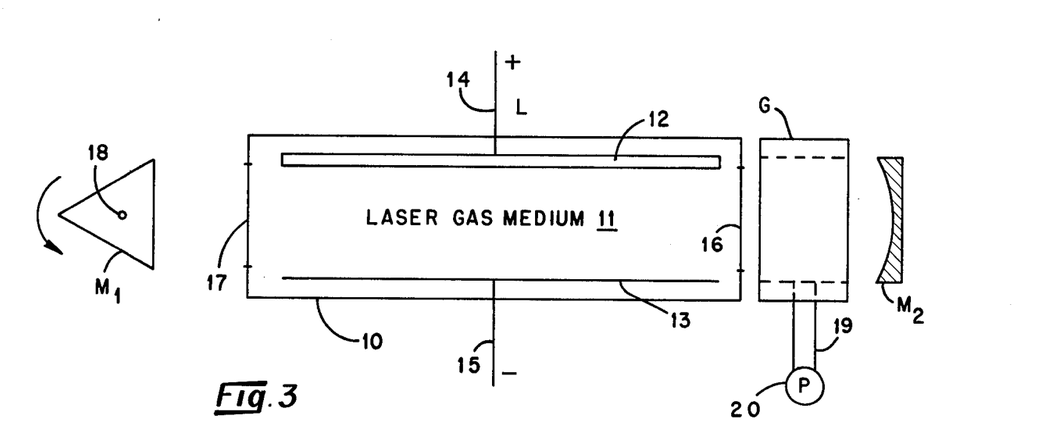
FIG. 3 illustrates a simple embodiment of a laser system for producing coherent $02°0 \rightarrow 01^{1}0$ radiation at 16 microns.

FIG. 3 illustrates an embodiment of a laser system for observing coherent 02°0 → 01¹0 radiation at 16$\mu$. The laser consists of a vessel 10, constructed of glass, for example, containing a gas laser medium 11 of $CO_2$ (and possibly $N_2$ and/or He). The medium 11 is subjected to an electrical discharge in the form of a simple glow at low operating pressures (1 to 100 torr), or in the form of an e-beam sustainer (not shown) at higher operating pressures (100 to 1000 torr). The electrical discharge is produced by a pair of spaced electrodes 12 and 13, constructed of aluminum, for example, located within vessel 10 and connected to positive and negative leads 14 and 15, respectively, of a power supply (not shown), such as a capacitor bank producing a voltage drop across electrodes 12 and 13 of about 30 KV. Vessel 10 is also provided with a pair of windows 16 and 17 in the ends thereof, constructed of KCl, for example, and which, for example, may be positioned at the Brewster angle, as known in the art. An optical resonator is formed by a rotating reflector or mirror $M_1$ and an output-coupling reflector or mirror $M_2$. Mirror $M_1$ is of a triangular configuration and is highly reflecting at wavelegth of 9.6 and 16 $\mu$, while mirror $M_2$ has a concave surface and is highly reflecting at 9.6 $\mu$ and partially transmitting at 16 $\mu$. Mirror $M_1$ rotates as indicated by the arrow about a pivot or point 18. The value of transmission via mirror $M_2$ will be determined by the small signal gain coefficient of the 16 $\mu$ transition and the photon lifetime in the resonator required for 16 $\mu$ radiation to build up and saturate the gain before V—V processes dissipate stored energy. A gas cell G is placed inside the resonator (between window 16 and mirror $M_2$) and filled with a gas (or gases) with properties which exhibit high loss at 10.6 $\mu$ to suppress the higher gain 00°1 → 10°0 $CO_2$ transition, while exhibiting high transmission at both 9.6 and 16 $\mu$. One such gas is $NH_3$ whose lowest lying fundamental band is at 960 cm$^{-1}$. The gas cell G is maintained under pressure through lines 19 by pressure accumulator or pump 20.

As described above, the electrical discharge will produce net gain at 9.6 $\mu$ in the structure shown in FIG. 3. When the rotating mirror $M_1$ is brought into alignment, a Q-switched pulse of 9.6 $\mu$ radiation will build up, dumping about half of the N(00°1) level population into the 02°0 level. Typical 9.6 $\mu$ pulse widths might be a few hundred nanoseconds (100 ns). Upon saturation, radiation will build up exponentially at 16 $\mu$ leading to saturation of the 16 $\mu$ gain and extraction of coherent radiation from the resonator.

As to what kinds of gain might be anticipated in practice, a rather detailed study of vibrational and rotational population distributions in a conventional $CO_2$—$N_2$—He laser has been reported by N. Djeu et al., IEEE J.Q.E., Vol. QE-4, 256 (1968). In a mixture of $CO_2$ (0.65 torr), $N_2$ (1.40 torr) and He (2.9 torr) a glow discharged produced 17% of the $CO_2$ molecules in the 00°1 level and a gas translational temperature of 332° K, and a rotational temperature of 340° K. If the 02°0 level population is also characterized by the translational temperature of about 350° K, the maximum small signal gain in the P-branch of the 02°0 → 01¹0 band will be (from FIG. 2) 0.08 cm$^{-1}$. The time Y(02°0) for this mixture can be evaluated as 4.8 $\mu$sec. Assuming 10% output coupling, a one meter long gain medium, and a small signal gain coefficient of 0.08 cm$^{-1}$, the required 130 db growth to saturation will require four passes through the resonator, or about 15 nsec. This is considerably shorter than Y($02^o0$) and the energy stored in the $02^o0$ can be efficiently extracted.

As the $CO_2$ (and $N_2$) pressure of the laser mixture is increased, pressure broadening will begin to dominate the transition linewidths. For the same fractional N($00^o1$) population density, the gain coefficient will remain the same but the stored energy density will increase proportional to the $CO_2$ partial pressure and the time Y($02^o0$) will decrease as the reciprocal of the pressure. One can, therefore, increase the pressure (and available 16 $\mu$ energy density) until the 16 $\mu$ pulse fails to grow sufficiently fast to saturate the 16 $\mu$ gain before V—V processes dissipate stored energy. The dynamic response of such a laser can easily be modeled in the presence of bot 9.6 and 16 $\mu$ radiation fields since all relevant pumping rates, V—V rates, and optical cross-sections are known. It should be noted that a continuous discharge can be used with repetitive Q-switching; The Q-switched pulse-rate will then be determined by the time for the $01^10$ population to equilibrate with the thermal bath (e.g., the V-T time for $CO_2$). Alternatively, the laser gas mixture could be flowed transversely past the optical resonator and linear glow discharge resulting in convective removal of excess $01^10$ level population.

Figure 4:
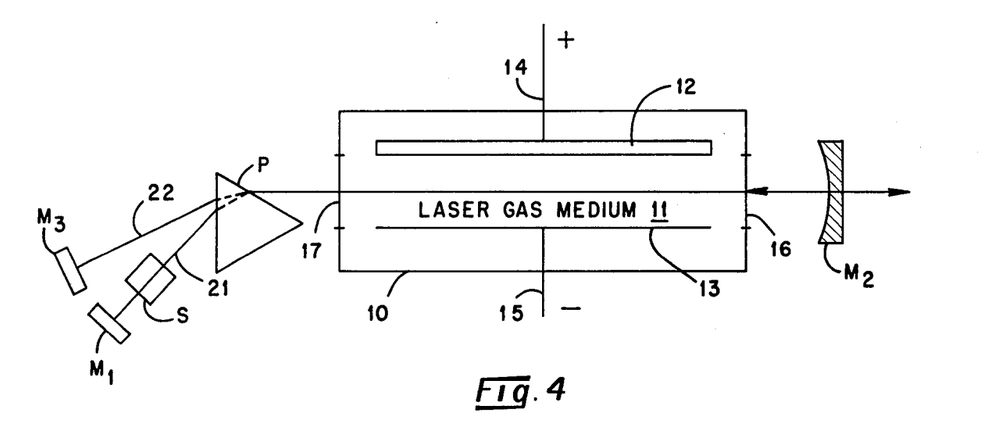
FIG. 4 illustrates another embodiment of a 16 micron laser system made in accordance with the invention.

An embodiment of an alternative laser system configuration is illustrated in FIG. 4. In this embodiment the laser gas cavity formed by vessel 10 having windows 16 and 17, electrodes 12 and 13, and containing a gas medium 11 and output-coupling reflector or mirror $M_2$ are the same as in the FIG. 3 embodiment. However, the gas cell G of FIG. 3 is replaced in FIG. 4 by a prism P (or possibly a grating) and an electro-optic switch S positioned intermediate prism P and a reflector or mirror $M_1'$. Mirror $M_1'$ is highly reflecting at 9.6 $\mu$ and is aligned with mirror $M_2$ for a ray at 9.6 $\mu$, indicated at 21, refracted through the prism P. A reflector or mirror $M_3$ which is highly reflecting at 16 $\mu$ is aligned with mirror $M_2$ for a ray at 16 $\mu$, as indicated at 22. The electro-optic switch S is activated to generate the saturating 9.6 $\mu$ pulse while the 16 $\mu$ resonator is always aligned. This arrangement provides independent control of the 9.6 and 16 $\mu$ regeneration times with a well defined sync pulse for timing the output pulse with additional laser sources for double resonance applications.

While the above description has been directed to $CO_2$ or $CO_2$—$N_2$-He as the gaseous lasing medium $N_2O$, OCS, and $CS_2$ are analogous molecules with similar energy level structures in which intense stimulated emission can be generated, and thus provide other candidates for the laser media.

Figure 5:
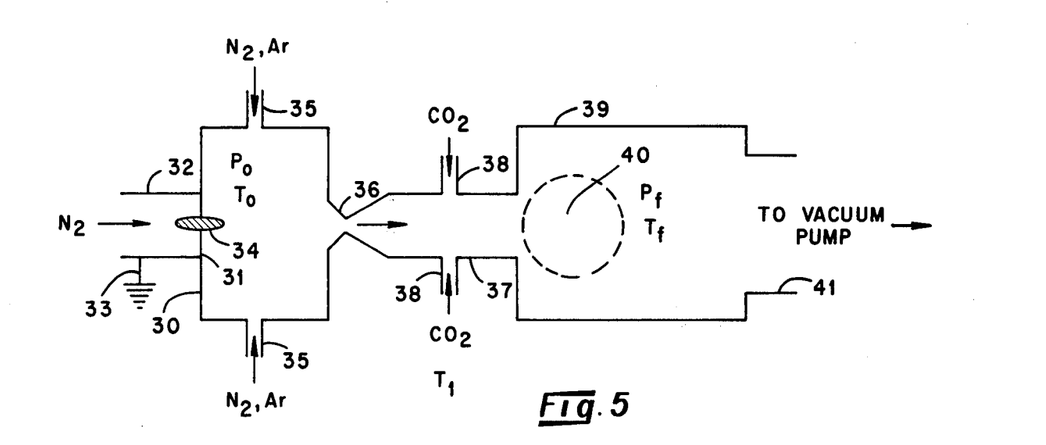
FIG. 5 illustrates an embodiment of a gas dynamic 16 micron $CO_2$ laser.
Figure 6:
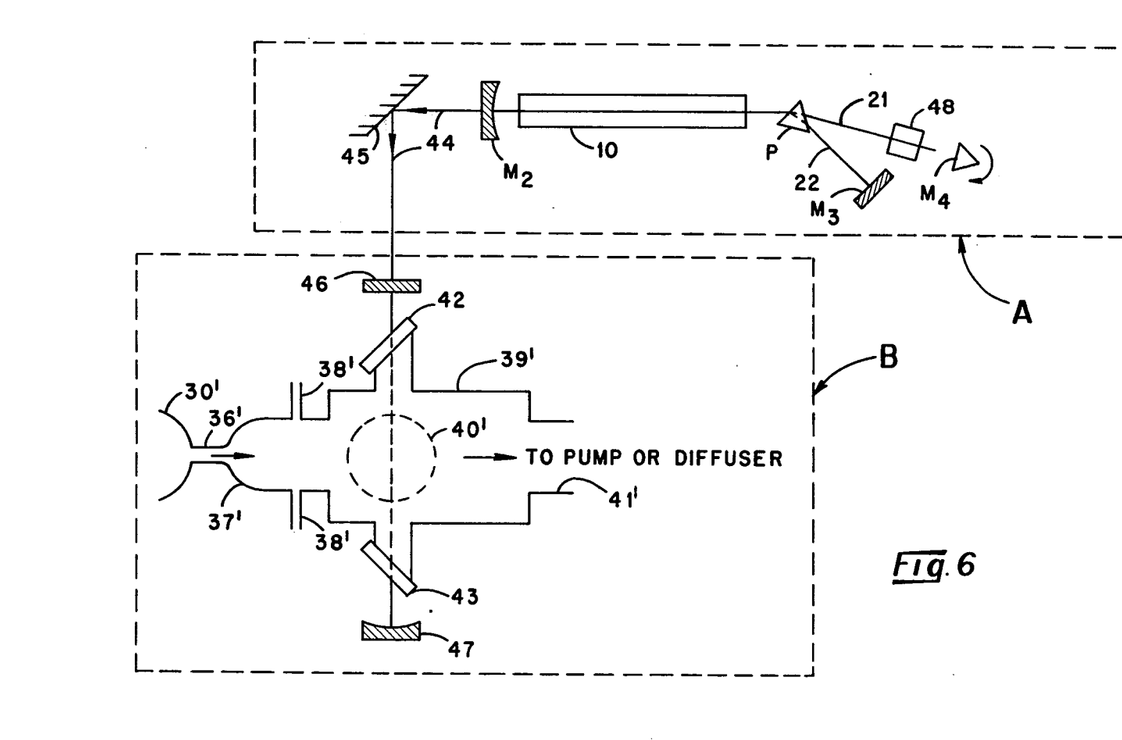
FIG. 6 illustrates an embodiment of an optically stimulated gas dynamic 16 micron $CO_2$ laser.

It has been shown above from a rough analysis of the relevant kinetic rates that useful 16 $\mu$ gain can be created between $02^o0 \rightarrow 01^10$ vibrational levels provided the effective temperature $T_3$ of the asymmetric stretching mode were made sufficiently greater than the effective temperature $T_2$ of the combined (N,00) and ($ON_2$-$^lO$) vibrational modes. While high $T_3$ values are possible using a direct electrical discharge in $CO_2$ (possibly mixed with other gases such as $N_2$ and/or He), such as by the apparatus of FIGS. 3 and 4, the current also tends to drive $T_2$ above the gas kinetic temperature. FIG. 2 illustrates the sensitivity of the small signal gain coefficient at 16 microns as a function of $T_3$ with $T_2$ as a parameter. Since low $T_2$ is of premium value, it is useful to identify laser pumping techniques which decouple the mechanisms which establish $T_2$ and $T_3$. FIGS. 5-7 illustrate embodiments of laser systems which provide this property.

The FIG. 5 embodiment employs a gas dynamic expansion of thermally pumped $N_2$ gas (and possibly a diluent gas such as Argon or He) supplied into an arc driven plenum defining essentially a thermal source. Cold (possibly pre-cooled to about 200° K) $CO_2$ is mixed with vibrationally hot $N_2$ in the supersonic flow through slot injectors. Referring now to the details of FIG. 5, this embodiment comprises a plenum or chamber 30 having an inlet 31 for $N_2$ gas across which an arc is produced by an arc source 32 having a ground connection 33, the $N_2$ gas flowing about a baffle 34 located in inlet 31 at the entrance to plenum 30. Inlets 35 supply a mixture of $N_2$ and Ar into plenum 30, the mixture being at pressure $P_o$ and temperature $T_o$ in plenum 30. The hot $N_2$ (1500° to 3000° K) mixture discharges from plenum 30 through a two dimensional expansion nozzle 36 into a mixer tube 37 with the thermal energy stored in the plenum 30 being partially converted to kinetic energy. The Ar as a diluent provides for relatively low volumetric flow rates (compared to He) and is considerably less efficient in deactivating the ($ON_2$-$^lO$) modes of $CO_2$. Because of a low $N_2$ vibrational deactivation rate, the high vibrational temperature of $N_2$ persists in the supersonic flow. One should strive to operate at expansion ratios such that the translation/rotational temperature of the $N_2$ in the supersonic flow are below room temperature, consistent with maintaining a usefully high $N_2$ vibrational temperature $T_r$. Precooled $CO_2$ at temperature $T_1$ (200° to 250° K) is directed into mixer tube 37 via inlets 38, with mixer tube 37 discharging into a plenum or chamber 39 having a mixed flow-resonator region 40 therein and including an exhaust opening 41 connected to a vacuum pump as indicated by legend, the flow-resonator region 40 being at a pressure $P_f$ and temperature $T_f$.

When the precooled $CO_2$ mixes with the $N_2$ flow in mixer tube 37, the ($OON_3$) modes of $CO_2$ will equilibrate with the $N_2$ vibrational modes, providing a high $T_3$, possibly near the stagnation temperature $T_o$. For a Mach 5 expansion and a 1500° K stagnation temperature $T_o$ a $T_3$ of about 1200° K with a $CO_2$ translational temperature/and $T_2$ temperature near 200° K can be expected. This performance would provide for useful 16 $\mu$ gain. Since the relevant kinetic rates are known for $N_2$, Ar, and $CO_2$, expansion and mixing can be accomplished. If the flow pressure $P_f$ in region 40 is raised above the torr region the pressure shortened Y($02^o0$) may preclude a sufficiently rapid buildup and saturation of the 9.6 micron gain and the 16 micron gain.

Since operating pressures of $CO_2$ above a torr is desirable from the point of view of increased volumetric energy storage at 16 $\mu$, some means must be devised to extract the available energy rapidly. This can be accomplished using an external 9.6/16 $\mu$ Q-switched driver oscillator (see FIG. 6), combining components of the FIGS. 3, 4 and 5 embodiments. The 9.6 $\mu$ and 16 $\mu$ output from a static 16 $\mu$ laser similar to that of FIG. 4 (as generally indicated at A) is coupled to the gas dynamic flow laser of FIG. 5 as generally indicated at B. Here the 9.6 $\mu$ radiation may be relatively weak, serving to avoid the necessity for radiation at these wavelengths to build-up from noise (e.g., approximately 100 db of small signal gain, or many transits through the supersonic flow).

Referring now to FIG. 6, the components corresponding to those of the FIGS. 3-5 embodiments will be given similar reference numerals, the principle differences between the FIGS. 4 and 5 embodiments being in replacing mirror $M_1$ and electro-optic switch S in the FIG. 4 embodiment with a 10.6 $\mu$ absorption cell 48 and a rotating reflector or mirror $M_4$, similar to those components of FIG. 3; and in providing the plenum 39 with windows 42 and 43, positioned at the Brewster angle on opposite sides of resonator region 40', whereby the 9.6/16 $\mu$ stimulating beam indicated at 44 passing through mirror $M_2$ is deflected by a mirror or reflector member 45 through window 42 into plenum 39' and through region 40' and out window 43, beam 44 being reflected back through plenum 39' by mirrors 46 and 47 positioned in spaced relation with respect to windows 42 and 43, the energy thus produced being extracted via mirror 47 as known in the art.

As pointed out above, other types of gaseous laser medium such as $N_2O$, OCS, $CS_2$ might be utilized in place of $CO_2$.

It has thus been shown that the present invention provides a method and apparatus for inducing laser action in $CO_2$ at a wavelength of 16 microns involving the population inversion between the $02^o0$ and $01^10$ states, and involves suppressing the 10.6 micron transition and encouraging the 9.6 micron transition, thus substantially advancing the state of the art.

While particular embodiments have been illustrated for carrying out the invention, modifications will become apparent to those skilled in the art, and it is intended to cover in the appended claims all such modifications as come within the spirit and scope of the invention.

What I claim is:

1. A method for inducing laser action in $CO_2$ contained in an optical resonant cavity at a wavelength of near 16 microns involving the transition between the $02^o0$ and $01^10$ energy levels comprising the steps of: pumping the $CO_2$ to the $00^o1$ energy level, suppressing the 10.6 micron transition to the $10^o0$ energy level while encouraging the 9.6 micron transition thereby populating the $02^o0$ energy level, and allowing the thus populated $02^o0$ energy level to decay to the $01^10$ energy level causing laser action at a wavelength of near 16 microns.

2. The method defined in claim 1, wherein the step of suppressing the 10.6 micron transition is carried out by disposing an absorber within the cavity which prevents passage of the 10.6 micron radiation.

3. The method defined in claim 1, wherein the step of pumping the $CO_2$ to the $00^o1$ energy level is carried out by mixing cool vibrationally excited nitrogen gas with the $CO_2$ thereby exciting the $CO_2$ to the vibrational $00^o1$ level without corresponding increase in population of the lower energy levels.

4. The method defined in claim 3, additionally including the step of mixing a diluent gas with the nitrogen gas.

5. The method defined in claim 3, wherein the step of mixing the excited nitrogen gas with the $CO_2$ is carried out by gas dynamic expansion.

6. The method defined in claim 3, additionally includes the step of stimulating the thus mixed excited nitrogen gas and $CO_2$ by directing a beam of 9.6/16 micron radiation thereinto.

7. A near 16 micron laser involving the transition between the $00^o1$ to $02^o0$ to $01^10$ energy levels of a gaseous lasing medium comprising: A vessel containing a gaseous lasing medium selected from the Group consisting of $CO_2$, $N_2O$, OCS, $CS_2$, and a $CO_2$—$N_2$—He mixture; means for pumping said gaseous medium to the $00^o1$ energy level; means positioned externally of said vessel and forming with said vessel an optical resonant cavity; and means for suppressing 10.6 micron transition to the $10^o0$ energy level while populating the $02^o0$ energy level, whereby near 16 micron radiation is obtained by decay to the $01^10$ energy level.

8. The near 16 micron laser defined in claim 7, wherein said pumping means comprises a pair of electrodes positioned in spaced relation within said vessel, and for producing an electrical discharge across said electrodes.

9. The near 16 micron laser defined in claim 7, wherein said means for forming with said vessel an optical resonant cavity comprises an output-coupling mirror highly reflecting at 9.6 microns and partially transmitting at near 16 microns positioned in spaced relation at one end of said vessel and a rotating mirror highly reflecting at 9.6 and near 16 microns positioned in spaced relation at an opposite end of said vessel and aligned with said output-coupling mirror.

10. The near 16 micron laser defined in claim 9, wherein said means for suppressing 10.6 micron transition comprises a gas cell positioned intermediate said vessel and said output-coupling mirror and which exhibits high loss at 10.6 microns and high transmission at 9.6 and near 16 microns.

11. The near 16 micron laser defined in claim 7, wherein said means for forming with said vessel an optical resonant cavity comprises an output-coupling mirror highly reflecting at 9.6 microns and partially transmitting at near 16 microns positioned in spaced relation at one end of said vessel, a prism positioned in spaced relation at an opposite end of said vessel, a first mirror highly reflecting at 9.6 microns positioned in spaced relation with said prism and aligned with said prism and said output-coupling mirror to reflect a ray at 9.6 microns refracted through said prism, an electro-optic switch positioned intermediate said prism and said first mirror, and a second mirror highly reflecting at near 16 microns positioned in spaced relation with said prism and aligned with said prism and said output-coupling mirror to reflect a ray at near 16 microns refracted through said prism.

12. The near 16 micron laser defined in claim 11, wherein said prism defines said means for suppressing 10.6 micron transition.

13. The near 16 micron laser defined in claim 7, wherein said means for forming with said vessel an optical resonant cavity comprises an output-coupling mirror highly reflecting at 9.6 microns and partially transmitting at near 16 microns positioned in spaced relation at one end of said vessel, a prism positioned in spaced relation at an opposite end of said vessel, a rotating mirror highly reflecting at 9.6 microns positioned in spaced relation with said prism and aligned with said prism and said output-coupling mirror to reflect rays at 9.6 and near 16 microns refracted through said prism, and a mirror highly reflecting at near 16 microns positioned in spaced relation with said prism and aligned with said prism and said output-coupling mirror to reflect a ray at near 16 microns refracted through said prism.

14. The near 16 micron laser defined in claim 13, wherein said means for suppressing 10.6 micron transition comprises an absorption cell positioned intermediate said prism and said rotating mirror, said absorption cell being constructed to exhibit high loss at 10.6 microns refracted through said prism and exhibit high transmission at 9.6 microns refracted through said prism.

15. The near 16 micron laser defined in claim 7, wherein said means for pumping said gaseous lasing medium comprises means for vibrationally exciting nitrogen gas; means for expansion cooling the thus excited nitrogen gas; and means for mixing the cooled, vibrationally excited nitrogen gas with the gaseous lasing medium causing pumping of the medium to the vibrational $00^o1$ energy level without substantial increase in population of lower energy levels.

16. The near 16 micron laser defined in claim 15, wherein said means for vibrationally exciting the nitrogen gas comprises an arc driven plenum.

17. The near 16 micron laser defined in claim 15, wherein said means for expansion cooling the excited nitrogen gas comprises a two dimensional nozzle positioned intermediate said nitrogen gas exciting means and said mixing means.

18. The near 16 micron laser defined in claim 7, wherein said gaseous lasing medium is composed of $CO_2$.

19. The near 16 micron laser defined in claim 15, additionally including means for stimulating emission of the mixed nitrogen gas and lasing medium.

* * * * *